United States Patent
Shibata

(10) Patent No.: US 8,751,702 B2
(45) Date of Patent: Jun. 10, 2014

(54) COMMUNICATION PROCESSING DEVICE THAT STORES COMMUNICATION DATA IN BUFFERS, IMAGE FORMING APPARATUS, AND METHOD OF COMMUNICATION PROCESSING

(71) Applicant: Yukihiro Shibata, Osaka (JP)

(72) Inventor: Yukihiro Shibata, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/770,121

(22) Filed: Feb. 19, 2013

(65) Prior Publication Data
US 2013/0219089 A1 Aug. 22, 2013

(30) Foreign Application Priority Data
Feb. 20, 2012 (JP) .................................. 2012-034169

(51) Int. Cl.
G06F 13/20 (2006.01)
(52) U.S. Cl.
USPC .............................................. 710/31; 710/52
(58) Field of Classification Search
None
See application file for complete search history.

(56) References Cited

U.S. PATENT DOCUMENTS

| 5,841,461 | A | * | 11/1998 | Katsuma | 347/195 |
| 6,633,404 | B1 | * | 10/2003 | Atsumi | 358/1.16 |
| 7,073,010 | B2 | * | 7/2006 | Chen et al. | 710/313 |
| 8,024,742 | B2 | * | 9/2011 | Lescouet et al. | 718/108 |
| 2005/0204189 | A1 | | 9/2005 | Akiba | |

FOREIGN PATENT DOCUMENTS

| JP | 05-158865 | 6/1993 |
| JP | 2005-302002 A | 10/2005 |

* cited by examiner

*Primary Examiner* — Cheng-Yuan Tseng
(74) *Attorney, Agent, or Firm* — McDonnell Boehnen Hulbert & Berghoff LLP

(57) ABSTRACT

A communication processing device includes a communication data processing circuit that (i) issues an access request for a buffer specified by a descriptor, among a plurality of buffers in a first memory, and (ii) outputs a predetermined switching permission signal at a time when a data access for one of the plurality of buffers is completed. The communication processing device also includes a second memory and a transmission destination switching circuit. The second memory includes a plurality of alternative buffers corresponding to the plurality of buffers. The transmission destination switching circuit switches a transmission destination of the access request from one of the plurality of buffers in the first memory to one of the plurality of alternative buffers in the second memory, based on the switching permission signal.

15 Claims, 6 Drawing Sheets

COMMUNICATION PROCESSING DEVICE THAT STORES COMMUNICATION DATA IN BUFFERS, IMAGE FORMING APPARATUS, AND METHOD OF COMMUNICATION PROCESSING

INCORPORATION BY REFERENCE

This application is based upon and claims the benefit of priority from corresponding Japanese Patent Application No. 2012-034169, filed Feb. 20, 2012, the entire contents of which is fully incorporated herein by reference.

BACKGROUND

The present invention relates to communication processing apparatuses that store communication data in buffers, image forming apparatuses, and methods of communication processing.

In a network communication processing device, a communication processing circuit stores received data in buffers through the use of direct memory access (DMA). When network data blocks are received, they are sequentially stored in the buffers. Management information for such buffers is held in descriptors that are provided in correspondence with the buffers. Buffers in which received data is to be stored are sequentially identified by referring to each corresponding descriptor.

In cases where descriptors are used as described above, the configuration of the descriptors needs to be changed when the configuration of the buffers is changed. However, when data blocks are received from a network during a period of processing for changing the descriptors, it is not clear whether or not the data has been properly buffered and, consequently, the integrity of the data content may not be accurate.

For instance, referring to FIG. 5A, in examples in which buffers are provided in a random access memory (RAM)—memory external to the communication processing circuit—and the power supply of the RAM is switched off in accordance with the power supply mode of the device, buffers used by the communication processing circuit may be switched from the buffers in the RAM to buffers in an internal memory that continues to be supplied with power, as illustrated in FIG. 5B. In such an example, received data may be lost during the switching process due to changes in the descriptors.

SUMMARY

In a first aspect, a communication processing device is provided that includes a communication data processing circuit that (i) issues an access request for a buffer specified by a descriptor, from among a plurality of buffers in a first memory, and (ii) outputs a predetermined switching permission signal at a time when a data access for one of the plurality of buffers is completed. The communication processing device also includes a second memory and a transmission destination switching circuit. The second memory includes a plurality of alternative buffers corresponding to the plurality of buffers. The transmission destination switching circuit switches a transmission destination of the access request from one of the plurality of buffers in the first memory to one of the plurality of alternative buffers in the second memory, based on the switching permission signal.

In a second aspect, an image forming apparatus is provided that includes a communication data processing circuit that (i) issues an access request for a buffer specified by a descriptor, from among a plurality of buffers in a first memory, and (ii) outputs a predetermined switching permission signal at a time when a data access for one of the plurality of buffers is completed. The image forming apparatus also includes a second memory, a transmission destination switching circuit, and a printing device. The second memory includes a plurality of alternative buffers corresponding to the plurality of buffers. The transmission destination switching circuit switches the transmission destination of the access request from one of the plurality of buffers in the first memory to one of the plurality of alternative buffers in the second memory, based on the switching permission signal. The printing device performs printing based on communication data processed by the communication processing circuit.

In a third aspect, a method of communication processing is provided. The method includes issuing, using a communication data processing circuit, an access request for a buffer from among a plurality of buffers in a first memory. The access request for the buffer is specified by a descriptor. The method also includes outputting, using the communication data processing circuit, a predetermined switching permission signal at a time when a data access for one of the plurality of buffers is completed. The method additionally includes switching, using a transmission destination switching circuit, a transmission destination of the access request from the buffer from among the plurality of buffers in the first memory to an alternative buffer from among a plurality of alternative buffers in a second memory, based on the switching permission signal.

Additional features and advantages are described herein, and will be apparent from the following Detailed Description and the figures.

DETAILED DESCRIPTION

Reference will now be made in detail to various embodiments of the disclosure, one or more examples of which are illustrated in the accompanying drawings. Each example is provided byway of explanation of the disclosure, and by no way limiting the present disclosure. It will be apparent to those skilled in the art that various modifications, combinations, additions, deletions and variations can be made in the present disclosure without departing from the intended scope or spirit. Features illustrated or described as part of one embodiment can be used in another embodiment to yield a still further embodiment. It is intended that the present disclosure cover such modifications, combinations, additions, deletions, applications and variations that come within the scope of the appended claims and their equivalents.

An embodiment of the present disclosure will now be described with reference to the figures.

Figure 1:
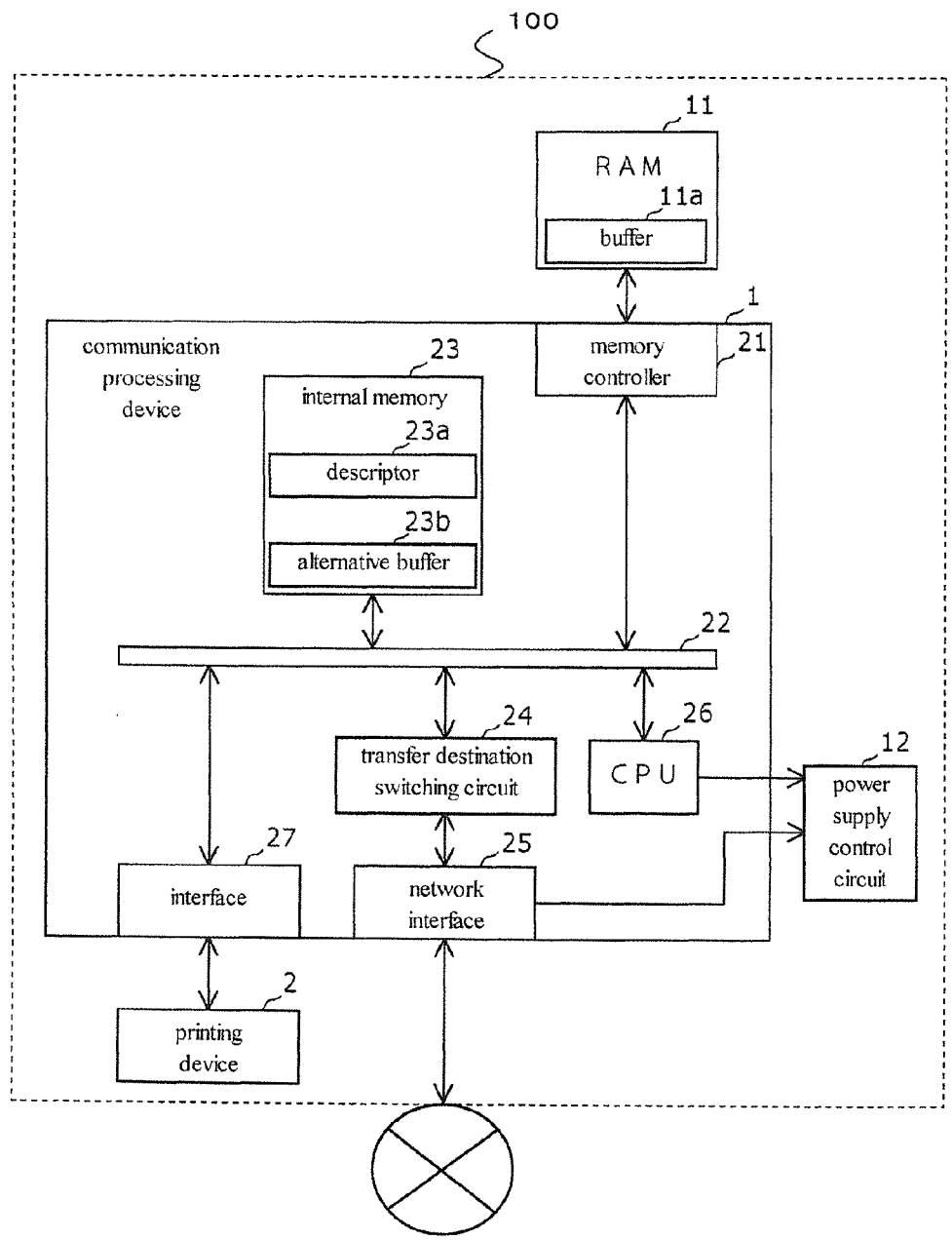
FIG. 1 is a functional block diagram of an image forming apparatus, according to an embodiment of the present disclosure.

FIG. 1 is a block diagram of a configuration of an image forming apparatus 100 according to an embodiment of the present disclosure. The image forming apparatus 100 includes a communication processing device 1, a printing device 2, a RAM 11 connected to the communication processing device 1, and a power supply control circuit 12 for shutting off and restoring supply of power to components within the image forming apparatus 100.

The communication processing device 1, which is connected to a network, transmits and receives data via the network.

The RAM 11 holds a plurality of buffers 11a used by the communication processing device 1 to store received data and/or transmission data. The RAM 11 may be, for example, a double-data-rate synchronous dynamic random access memory (DDR SDRAM). The power supply control circuit 12 shuts off or restores supply of power to the RAM 11 in accordance with a command received from the communication processing device 1.

The communication processing device 1 includes a memory controller 21, an internal bus 22, an internal memory 23, a transfer destination switching circuit 24, a network interface 25 serving as a communication data processing circuit, a central processing unit (CPU) 26, and an interface 27.

The memory controller 21, which is connected to the internal bus 22, reads and writes data from and into the RAM 11.

The internal memory 23, which is connected to the internal bus 22, stores a plurality of descriptors 23a corresponding to the plurality of buffers 11a and holds alternative buffers 23b that may be used alternatively to the buffers 11a in the RAM 11. Note that the internal memory 23 is, for example, a static RAM (SRAM) which consumes less power than a DRAM, and power continues to be supplied to the internal memory 23 even when supply of power to the RAM 11 is shut off.

Figure 2:
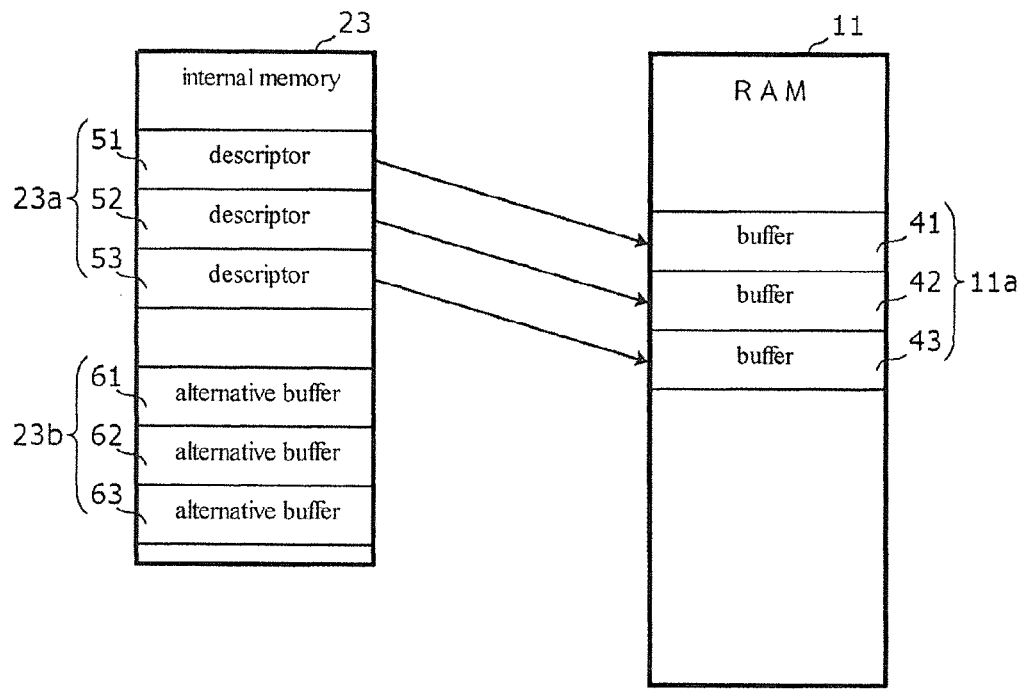
FIG. 2 is a diagram illustrating an example relationship between the descriptors and the buffers illustrated in FIG. 1, according to an embodiment of the present disclosure.

FIG. 2 is a diagram for explaining the relationship between the descriptors 23a and the buffers 11a illustrated in FIG. 1. In the example illustrated in FIG. 2, buffers 41, 42, and 43 are held in the RAM 11, and descriptors 51, 52, and 53 corresponding to the buffers 41, 42, and 43 are stored in the internal memory 23. The buffers 41, 42, and 43 form a ring buffer and are used sequentially and cyclically, for example, in the order of the buffer 41, the buffer 42, and the buffer 43. The descriptor 51 includes the management information for the buffer 41 (the address of the next descriptor 52, the address of the buffer 41, the status information of the buffer 41, and the like), the descriptor 52 includes the management information for the buffer 42, and the descriptor 53 includes the management information for the buffer 43. The internal memory 23 holds alternative buffers 61, 62, and 63. The alternative buffers 61, 62, and 63 are alternative buffers for the buffers 41, 42, and 43, respectively. In the present embodiment, the alternative buffer 61 has the same capacity as the buffer 41, the alternative buffer 62 has the same capacity as the buffer 42, and the alternative buffer 63 has the same capacity as the buffer 43.

The transfer destination switching circuit 24 (shown in FIG. 1 and also referred to as the "transmission destination switching circuit"), upon input of a predetermined switching permission signal, switches the transfer destination (transmission destination) of an access request provided from the network interface 25 from the buffers 11a (the buffers 41, 42, 43 in the RAM 11) to the alternative buffers 23b (the buffers 61, 62, 63 in the internal memory 23). The transfer destination switching circuit 24, upon input of a predetermined switching prohibition signal, switches back the transfer destination of the access request from the alternative buffers 23b to the buffers 11a.

In the present embodiment, the transfer destination switching circuit 24, upon completing writing data into the buffers 11a specified by the descriptors 23a or the corresponding alternative buffers 23b, writes identification data that indicates whether the data has been written into the buffers 11a or the alternative buffers 23b along with information that indicates the completion of the writing of the data, into the descriptors 23a. The identification data is written into the descriptors 23a, for example, as part of the status information.

The transfer destination switching circuit 24, based on the offset addresses of the buffers 11a in the RAM 11 and the offset addresses of the alternative buffers 23b in the internal memory 23, identifies addresses in the alternative buffers 23b from the addresses in the buffers 11a specified by access requests, and switches the transfer destination addresses of the access requests from the addresses in the buffers 11a to the addresses in the alternative buffers 23b.

Note that the address information of the descriptors 51, 52, and 53, the offset address information of the buffers 11a in the RAM 11, and the offset address information of the alternative buffers 23b in the internal memory 23 are set by, for example, the CPU 26 and the network interface 25, in the transfer destination switching circuit 24 at an initialization time. Moreover, address mask information for prohibiting the transfer destination address from being converted into a region outside the alternative buffers 23b in the internal memory 23 is set in the transfer destination switching circuit 24 at the initialization time.

For example, the address mask information includes address information specifying a region outside the alternative buffers 23b. The transfer destination switching circuit 24, with reference to the address mask information when converting the transfer destination address, ensures that conversion into a region outside the alternative buffers 23b is not performed.

The network interface 25 performs data communication with other apparatuses via a network. The network interface 25 has a DMA controller and, by reading the descriptors 23a, uses the buffers 11a specified by the descriptors 23a. For example, the network interface 25 sequentially stores received data blocks in the plurality of the buffers 11a as specified by the descriptors 23a.

Specifically, the network interface 25 reads the descriptors 23a and issues access requests that specify the addresses of the buffers 11a (as specified by the descriptors 23a). These access requests are requests for reading or writing communication data (received data or transmission data).

The network interface 25, before the power supply control circuit 12 shuts off a supply of power to the RAM 11, inputs a switching permission signal to the transfer destination switching circuit 24, and when the network interface 25 detects that the power supply control circuit 12 has restored the supply of power to the RAM 11, the network interface 25 inputs a switching prohibition signal to the transfer destination switching circuit 24.

The switching permission signal described above is input to the transfer destination switching circuit 24 at a time when writing of data into one of the buffers 11a has been completed. Similarly, the switching prohibition signal described above, is input to the transfer destination switching circuit 24 at a time when writing of data into one of the alternative buffers 23b has been completed.

The CPU 26 operates in accordance with a program stored in, for example, a read only memory (ROM) (not illustrated).

The CPU 26, in accordance with the program, provides a command for shutting off supply of power to the power supply control circuit 12 after the switching permission signal has been input to the transfer destination switching circuit 24.

The interface 27, which is connected to the printing device 2, transmits received data and the like to the printing device 2.

The printing device 2 performs printing based on the received data transmitted from the communication processing device 1. For example, the printing device 2 may generate image data from the received data, perform predetermined image processing on the generated image data, and after processing the image data, print on a printing sheet using, for example, an electrophotographic method.

The operation of the communication processing device 1 of the image forming apparatus 100 will now be described.

Figure 3:
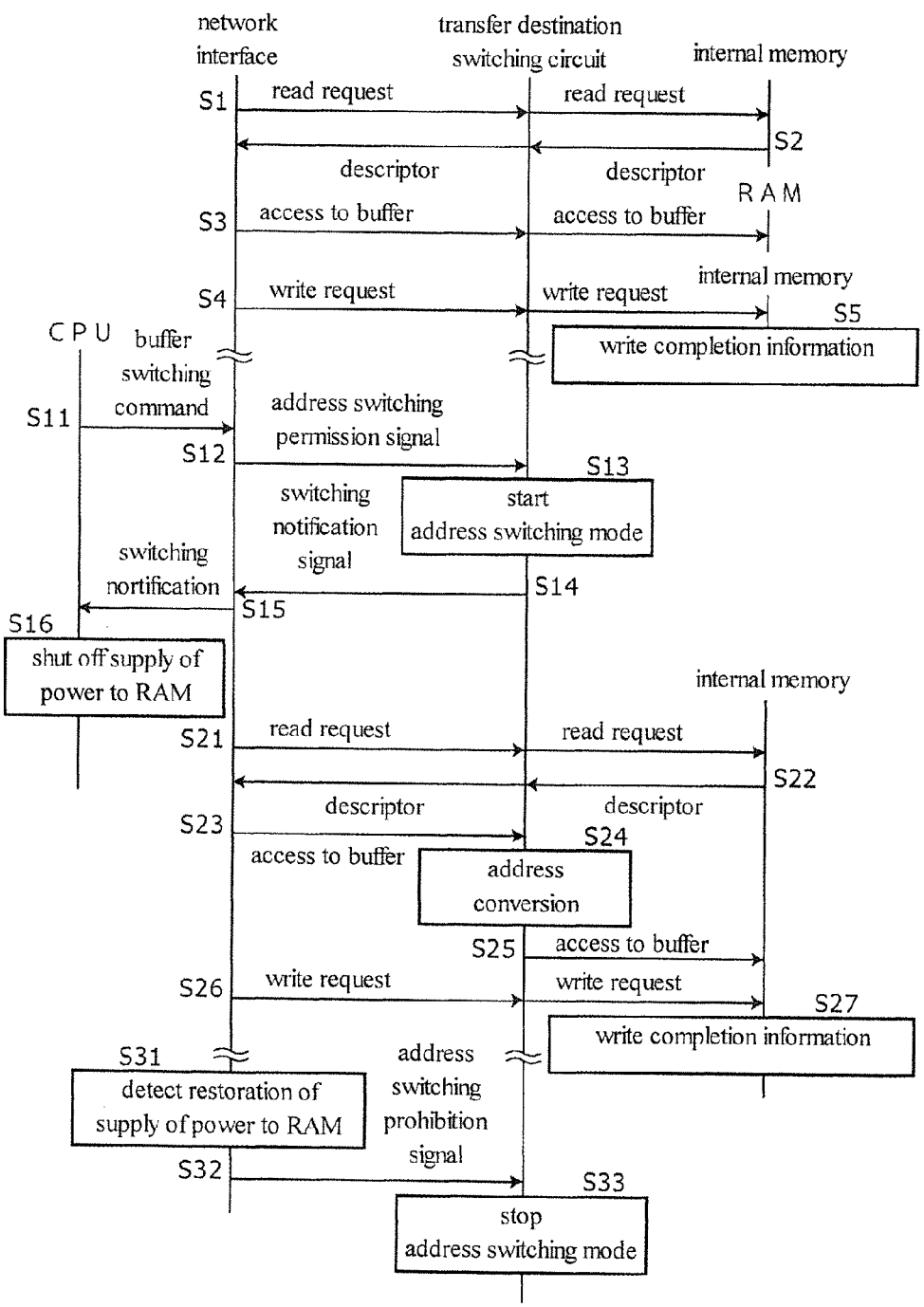
FIG. 3 is a sequence diagram illustrating the operation of the communication processing device illustrated in FIG. 1, according to an embodiment of the present disclosure.

FIG. 3 is a sequence diagram illustrating the operation of the communication processing device 1 illustrated in FIG. 1.

First, in a normal power supply mode, the buffers 11a of the RAM 11 are used as the buffers for the communication data of the communication processing device 1.

In the normal power supply mode, the network interface 25 first outputs a read request for the descriptor 51 to use the buffer 41, and the transfer destination switching circuit 24 outputs the read request to the internal bus 22 (step S1). The transfer destination switching circuit 24 outputs the read request as it is to the internal bus 22 without conversion of the transfer destination of the read request. The internal memory 23, upon receipt of the read request, outputs the descriptor 51. The transfer destination switching circuit 24, upon receipt of the descriptor 51 from the internal bus 22, outputs the descriptor 51 to the network interface 25 (step S2).

Then, the network interface 25 identifies the location (address) of the buffer 41 based on the descriptor 51, and starts an access request (write request or read request) for the buffer 41 (step S3). At this time, the transfer destination switching circuit 24 outputs the access request to the internal bus 22 without conversion of the transfer destination of the access request. When an access request (write or read) made to the buffer 41 is completed, the network interface 25 outputs a write request for writing completion information into the descriptor 51, and the transfer destination switching circuit 24 outputs the write request to the internal bus 22 without conversion of the transfer destination address of the write request (step S4). The internal memory 23, upon receipt of the write request, writes the completion information into the descriptor 51 (step S5).

Note that when the next buffer 42 is used, the network interface 25 reads the next descriptor 52, which follows the descriptor 51, and uses the corresponding buffer 42. Subsequently, in a similar manner, the buffers 11a (41, 42, and 43) continue to be used in sequential order.

Next, the CPU 26, upon detection of an event that causes, for example, transition to a power saving mode, provides a buffer switching command to the network interface 25 in accordance with the program (step S11). In the power saving mode, since the supply of power to the RAM 11 is stopped, the communication data buffers of the network interface 25 are switched from the buffers 11a in the RAM 11 to the alternative buffers 23b in the internal memory 23 prior to the transition to the power saving mode.

The network interface 25, upon receipt of the buffer switching command, inputs an address switching permission signal to the transfer destination switching circuit 24 at the time when the use of the buffer (one of the buffers 41, 42, and 43) is finished (step S12).

The transfer destination switching circuit 24, upon receipt of the address switching permission signal, starts to operate in an address switching mode (step S13). In the address switching mode, the transfer destination address of the access request from the network interface 25 is switched from an address in the RAM 11 to an address in the internal memory 23.

The transfer destination switching circuit 24 provides a switching notification signal to the network interface 25 (step S14), and the network interface 25, upon receipt of the switching notification signal, provides the switching notification to the CPU 26 (step S15). The CPU 26, upon receipt of the switching notification, provides the power supply control circuit 12 with a power shut-off command for shutting off supply of power to the RAM 11 (step S16).

Moreover, in the address switching mode, the network interface 25 first outputs read requests for the descriptors 51, 52, and 53 to use the buffers 41, 42, and 43, and the transfer destination switching circuit 24 outputs the read requests to the internal bus 22 (step S21). At this time, the transfer destination switching circuit 24 outputs the read requests to the internal bus 22 as they are without conversion of the transfer destination addresses of the read requests. The internal memory 23, upon receipt of the read requests, outputs the requested descriptors 51, 52, and 53. The transfer destination switching circuit 24, upon receipt of the requested descriptors 51, 52, and 53 from the internal bus 22, outputs the descriptors 51, 52, and 53 to the network interface 25 (step S22).

Then the network interface 25 identifies the locations of the buffers 41, 42, and 43 from the descriptors 51, 52, and 53 and starts access requests specifying the addresses of the buffers 41, 42, and 43 (step S23).

The transfer destination switching circuit 24, upon receipt of the access requests for the buffers 41, 42, and 43, converts the transfer destination addresses of the access requests into addresses corresponding to the alternative buffers 61, 62, and 63, and then outputs the access requests to the internal bus 22 (step S24).

Figure 4:
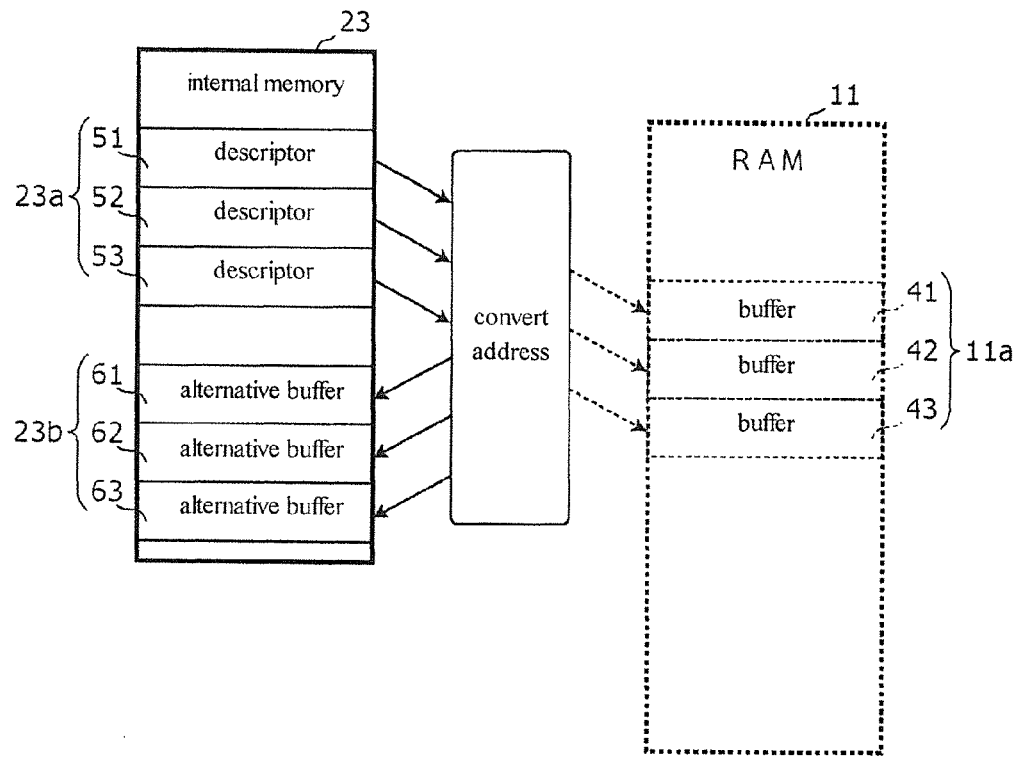
FIG. 4 is a schematic diagram illustrating switching of the transfer destinations of access requests performed by the communication processing device illustrated in FIG. 1, according to an embodiment of the present disclosure.
Figure 5A:
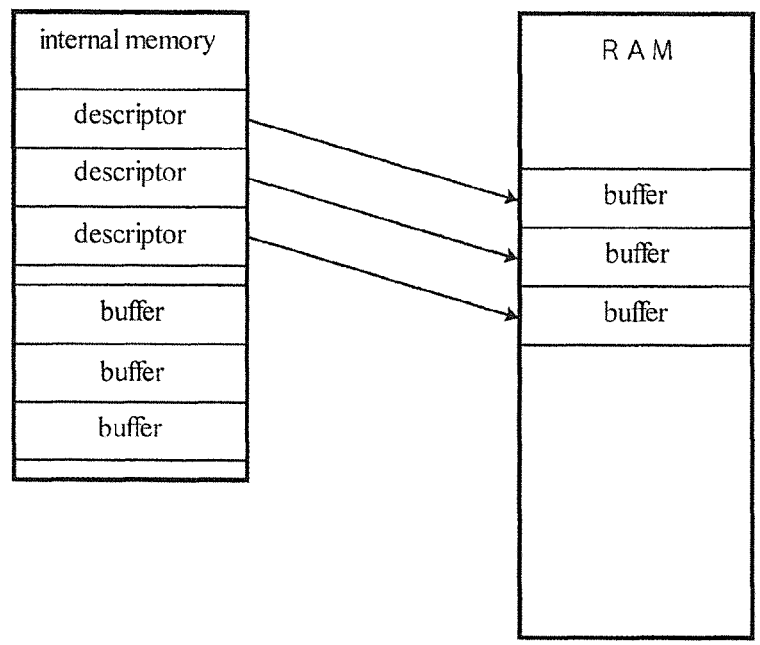
FIGS. 5A and 5B are diagrams illustrating rewriting of the descriptors at the time when the buffers are switched, according to an embodiment of the present disclosure.
Figure 5B:
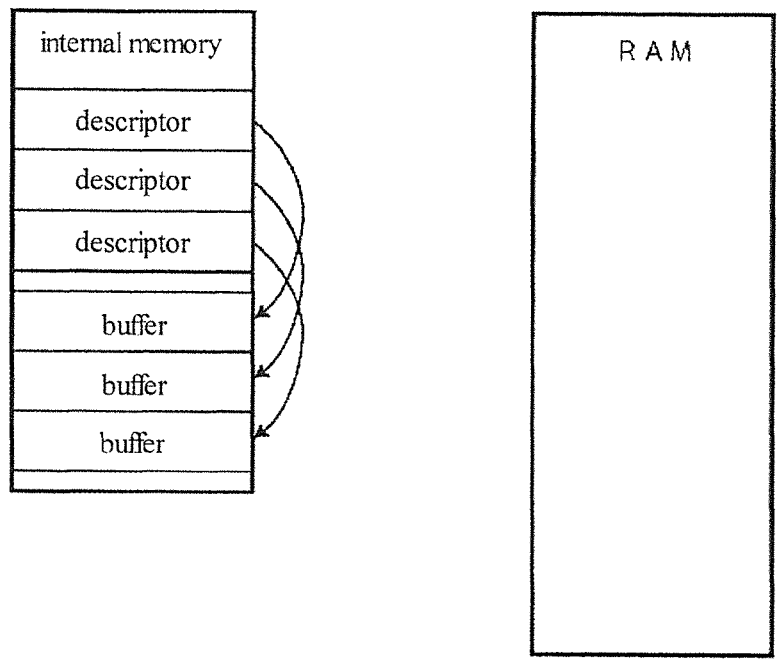

FIG. 4 is a schematic diagram illustrating switching of the transfer destinations of the access requests performed by the communication processing device 1 illustrated in FIG. 1. Referring to FIG. 4, as a result of the conversion of the addresses of the transfer destinations, the access requests reach the internal memory 23. In other words, the addresses of the transfer destinations of the access requests are converted only when the addresses of the transfer destinations of the access requests are the addresses of the buffers 41, 42, and 43 in the address switching mode.

Following the conversion, when (write or read) accesses to the buffers are completed, the network interface 25 outputs write requests for writing completion information into the descriptors 51, 52, and 53 corresponding to the buffers, and the transfer destination switching circuit 24 outputs the write requests to the internal bus 22 as they are without conversion of the transfer destination addresses of the write requests (step S26). The internal memory 23, upon receipt of the write requests, writes the completion information into the descriptors 51, 52, and 53 (step S27).

However, in step S26, when buffers were used to store received data, the transfer destination switching circuit 24 adds, to the completion information in the write requests, identification data indicating whether the buffers 41, 42, and 43 or the alternative buffers 61, 62, and 63 were physically used. As a result, the internal memory 23, upon receipt of the write requests, writes completion information and the identification information into the descriptors 51, 52, and 53. After that, when the interface 27 or the CPU 26 reads received data from the buffers, for example, locations (the buffers 41, 42, and 43 or the alternative buffers 61, 62, and 63) where the received data has been physically stored can be identified using the identification data in the descriptors 51, 52, and 53.

After that, when an event causing supply of power to the RAM 11 to be restored is detected or when the restoration of supply of power to the RAM 11 is detected (step S31), the network interface 25 inputs an address switching prohibition signal to the transfer destination switching circuit 24 at the time when the use of the buffers having been used until then is completed (step S32).

The transfer destination switching circuit 24, upon receipt of the address switching prohibition signal, stops operating in the address switching mode (step S33). That is, the transfer destination switching circuit 24 does not convert the transfer destination addresses of access requests until an address switching permission signal is received again.

According to the above-described embodiment, the network interface 25 outputs a predetermined switching permission signal to the transfer destination switching circuit 24 at the time when a data access to at least one of the buffers 11a has been completed, and the transfer destination switching circuit 24, upon input of the predetermined switching permission signal, switches the transfer destinations of access requests provided from the network interface 25 from the buffers 11a to the alternative buffers 23b.

As a result, since buffers are switched without changing the descriptors 23a, a period necessary for buffer switching can be decreased, and may be switched, possibly without losing any communication data.

Note that although the embodiment described above is an example of the present invention, the present invention is not limited to this, and various modifications are possible within the scope of the present invention.

For example, in the embodiment described above, the CPU 26 may be provided outside of the communication processing device 1 and may be connected to the communication processing device 1, whereby supply of power to the CPU 26 as well as the RAM 11 may be shut off or restored using the power supply control circuit 12.

In the embodiment described above, identification data is written into the descriptors only in the address switching mode. However, identification data may be written into the descriptors also when not in the address switching mode.

In the embodiment described above, the network interface 25 detects the restoration of supply of power to the RAM 11. However, a configuration may be employed in which when the supply of power to the CPU 26 is not shut off when supply of power to the RAM 11 is shut off, the CPU 26 detects the restoration of supply of power to the RAM 11 and provides a command to output an address switching prohibition signal to the network interface 25.

In the embodiment described above, the network interface 25 stores communication data of a local area network (LAN), such as Ethernet®, in the buffers 11a or the alternative buffers 23b.

The invention is claimed as follows:

1. A communication processing device comprising:
   a communication data processing circuit that (i) issues an access request for a buffer specified by a descriptor, from among a plurality of buffers in a first memory, and (ii) outputs a predetermined switching permission signal at a time when a data access for one of the plurality of buffers is completed;
   a second memory including a plurality of alternative buffers corresponding to the plurality of buffers;
   a transmission destination switching circuit that switches a transmission destination of the access request from one of the plurality of buffers in the first memory to one of the plurality of alternative buffers in the second memory, based on the switching permission signal; and
   a control unit that controls a supply of power to the first memory,
   wherein the control unit shuts off the supply of power to the first memory after making the switching permission signal that is output from the communication data processing circuit to be input to the transmission destination switching circuit.

2. The communication processing device according to claim 1,
   wherein the transmission destination switching circuit, when a predetermined switching prohibition signal is input after the switching permission signal has been input, switches the transmission destination of the access request from one of the plurality of alternative buffers in the second memory back to one of the plurality of buffers in the first memory, and
   wherein the communication data processing circuit inputs the switching prohibition signal to the transmission destination switching circuit after the control unit has restored the supply of power to the first memory.

3. The communication processing device according to claim 1,
   wherein the transmission destination switching circuit, after writing data into the buffer specified by the descriptor or the alternative buffer corresponding to the specified buffer has been completed, writes identification information indicating whether the writing of data has been made to the buffer or the alternative buffer into the descriptor together with information about completion of the writing of data.

4. The communication processing device according to claim 1, further comprising:
   a memory controller connected to the first memory; and
   an internal bus to which the memory controller and the second memory are connected,
   wherein the first memory is an external memory,
   wherein the second memory is an internal memory, and
   wherein the transmission destination switching circuit is provided between the communication data processing circuit and the internal bus.

5. The communication processing device according to claim 1,
   wherein the transmission destination switching circuit identifies an address in the alternative buffer using an address in the buffer specified in the access request, based on offset addresses of the plurality of buffers in the first memory and offset addresses of the plurality of alternative buffers in the second memory.

6. An image forming apparatus comprising:
   a communication data processing circuit that (i) issues an access request for a buffer specified by a descriptor, from among a plurality of buffers in a first memory, and (ii) outputs a predetermined switching permission signal at a time when a data access for one of the plurality of buffers is completed;
   a second memory including a plurality of alternative buffers corresponding to the plurality of buffers;
   a transmission destination switching circuit that switches a transmission destination of the access request from one of the plurality of buffers in the first memory to one of the plurality of alternative buffers in the second memory, based on the switching permission signal;
   a control unit that controls a supply of power to the first memory; and a printing device that performs printing based on communication data processed by the communication processing circuit, wherein the control unit shuts off the supply of power to the first memory after making the switching permission signal that is output from the communication data processing circuit to be input to the transmission destination switching circuit.

7. The image forming apparatus according to claim 6, wherein, when a predetermined switching prohibition signal is input after the switching permission signal has been input, the transmission destination switching circuit switches the transmission destination of the access request from one of the plurality of alternative buffers in the second memory back to one of the plurality of buffers in the first memory, and wherein the communication data processing circuit inputs the switching prohibition signal to the transmission destination switching circuit after the control unit has restored the supply of power to the first memory.

8. The image forming apparatus according to claim 6, wherein the transmission destination switching circuit, after writing data into the buffer specified by the descriptor or the alternative buffer corresponding to the specified buffer has been completed, writes identification information indicating whether the writing of data has been made to the buffer or the alternative buffer into the descriptor together with information about completion of the writing of data.

9. The image forming apparatus according to claim 6, wherein a memory controller is connected to the first memory, wherein the memory controller and the second memory are connected to an internal bus, wherein the first memory is an external memory, wherein the second memory is an internal memory, and wherein the transmission destination switching circuit is provided between the communication data processing circuit and the internal bus.

10. The image forming apparatus according to claim 6, wherein the transmission destination switching circuit identifies an address in the alternative buffer using an address in the buffer specified in the access request, based on offset addresses of the plurality of buffers in the first memory and offset addresses of the plurality of alternative buffers in the second memory.

11. A method of communication processing comprising:

issuing, using a communication data processing circuit, an access request for a buffer from among a plurality of buffers in a first memory, wherein the access request for the buffer is specified by a descriptor;

outputting, using the communication data processing circuit, a predetermined switching permission signal at a time when a data access for one of the plurality of buffers is completed;

switching, using a transmission destination switching circuit, a transmission destination of the access request from the buffer from among the plurality of buffers in the first memory to an alternative buffer from among a plurality of alternative buffers in a second memory, based on the switching permission signal; and controlling, using a control unit, a supply of power to the first memory, wherein the control unit shuts off the supply of power to the first memory after making the switching permission signal that is output from the communication data processing circuit to be input to the transmission destination switching circuit.

12. The method according to claim 11, further comprising:

switching, using the transmission destination switching circuit, the transmission destination of the access request from one of the plurality of alternative buffers in the second memory back to one of the plurality of buffers in the first memory when a predetermined switching prohibition signal is input after the switching permission signal has been input; and inputting, using the communication data processing circuit, the switching prohibition signal to the transmission destination switching circuit after the control unit has restored the supply of power to the first memory.

13. The method according to claim 11, further comprising:

writing, using the transmission destination switching circuit, identification information indicating whether the writing of data has been made to the buffer or the alternative buffer into the descriptor together with information about completion of the writing of data, after writing data into the buffer specified by the descriptor or the alternative buffer corresponding to the specified buffer.

14. The method according to claim 11, wherein a memory controller is connected to the first memory, wherein the memory controller and the second memory are connected to an internal bus, wherein the first memory is an external memory, wherein the second memory is an internal memory, and wherein the transmission destination switching circuit is provided between the communication data processing circuit and the internal bus.

15. The method according to claim 11, further comprising:

identifying, using the transmission destination switching circuit, an address in the alternative buffer using an address in the buffer specified in the access request, based on offset addresses of the plurality of buffers in the first memory and offset addresses of the plurality of alternative buffers in the second memory.

* * * * *